United States Patent [19]

Craig

[11] Patent Number: 4,505,664
[45] Date of Patent: Mar. 19, 1985

[54] BLOW MOLDING MACHINE

[75] Inventor: Walter J. Craig, Lockport, Ill.

[73] Assignee: Hoover Universal, Inc., Ann Arbor, Mich.

[21] Appl. No.: 561,362

[22] Filed: Dec. 13, 1983

[51] Int. Cl.³ ............................................. B29C 17/07
[52] U.S. Cl. ................................. 425/525; 264/526; 264/528; 264/529; 425/526; 425/530; 425/534; 425/535; 425/540
[58] Field of Search ............... 425/525, 526, 530, 534, 425/535, 536, 538, 540; 264/526, 528, 529

[56] References Cited

U.S. PATENT DOCUMENTS

| | | | |
|---|---|---|---|
| 2,290,129 | 7/1942 | Moreland et al. | 425/525 |
| 2,914,799 | 12/1959 | Canfield | 425/540 X |
| 3,212,129 | 10/1965 | Craig et al. | 425/540 X |
| 3,305,890 | 2/1967 | Senior et al. | 425/526 |
| 4,063,867 | 12/1977 | Janniere | 425/526 |

FOREIGN PATENT DOCUMENTS

| | | | |
|---|---|---|---|
| 1604549 | 3/1971 | Fed. Rep. of Germany | 425/525 |
| 3114504 | 10/1982 | Fed. Rep. of Germany | 425/525 |
| 2385594 | 10/1978 | France | 425/525 |

*Primary Examiner*—Jan Silbaugh
*Attorney, Agent, or Firm*—Stephenson and Boller

[57] ABSTRACT

A machine particularly useful for the blow molding of large thermoplastic articles such as cylindrical drums comprises a plurality of stations through which mold cavities are successively advanced. At a first station, containing a cart-mounted blow assembly an article is blow molded to substantially its final form in a cavity with the blow medium being introduced via a blow pin assembly operatively associated with the cavity after the blow assembly has been operatively engaged with the blow pin assembly. After the blowing operation has been completed, the blow assembly is operatively disengaged from the blow pin assembly and the cavity with the blown article is transported in a second station, the blow pin assembly traveling with the cavity. At the second station, an auxiliary blow assembly is operatively engaged with the blow pin assembly to circulate medium through the interior of the article. At the conclusion of operation at the second station, the auxiliary blow assembly is disengaged from the blow pin assembly and the cavity is transported to a further station. The disclosed embodiment has two such further stations which are identical to the second station. The cavity finally returns to the first station where the completed article is removed.

24 Claims, 9 Drawing Figures

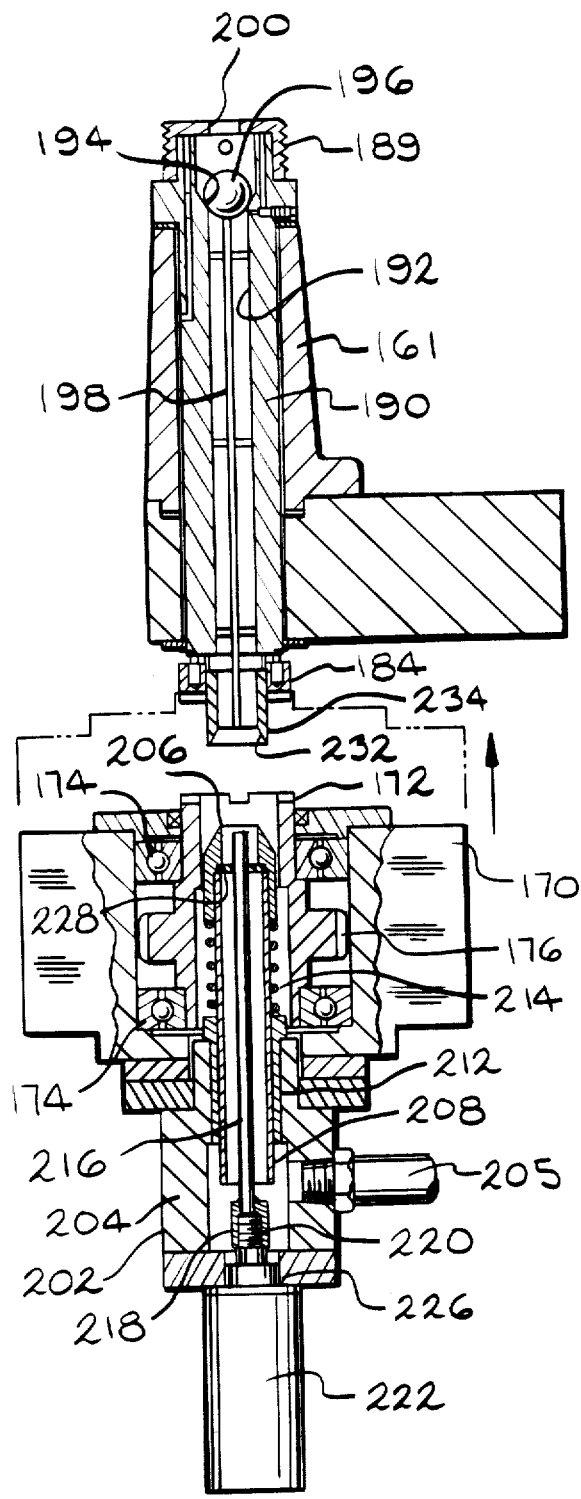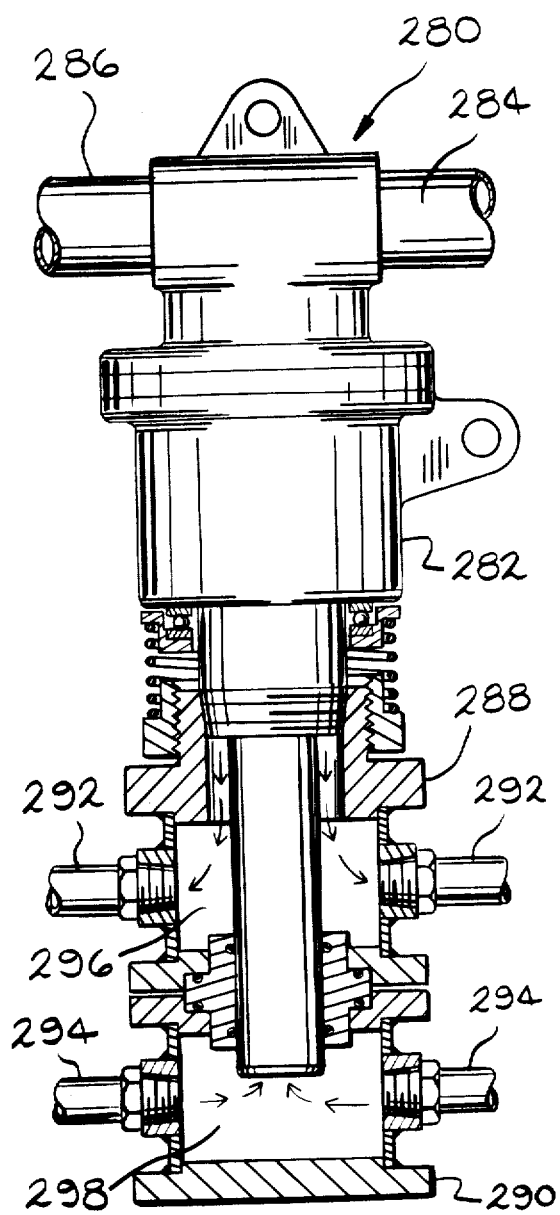
FIG. 8
FIG. 9

BLOW MOLDING MACHINE

BACKGROUND AND SUMMARY OF THE INVENTION

This invention relates generally to blow molding machines and particularly to a machine which has special utility in the blow molding of large hollow articles. For example, it is particularly well suited for the blow molding of large cylindrically walled drums, such as commonly referred to as 55 gallon drums.

Blow molding machines are utilized to blow mold hollow plastic articles, and it has heretofore been known to blow mold articles of almost innumerable shapes with a wide variety of different types of blow molding machines. Blow molding machines may comprise multiple stations at which different operations of the overall blow molding process are conducted. Hence, a blow molded article is created by successively advancing mold cavities through the various stations until the completed articles are finally removed.

A typical known blow molding procedure involves the creation of a parison, confinement of the parison within a cavity, blowing of the parison in successive stages to finally yield a completed article conforming to the shape of the cavity, and finally removing the blow molded article after it has become substantially dimensionally stable.

The present invention arises in part through the recognition that the procedures of prior blow molding of smaller articles are not readily conformable to the blow molding of large thermoplastic articles, such as large drums.

One problem which is encountered in the blow molding of large plastic articles is that a substantial amount of cooling must take place in order for the plastic material to become dimensionally stable. This can be appreciated when one considers the fact that as the size of an article increases, its surface area increases at a lower rate than does its volume. This means that cooling efficiency of a blow molding machine decreases as a function of article size, and the problem is compounded because larger volume articles, such as drums for carrying bulk material, require larger wall thicknesses to provide strength.

Also, in the case of drums such as those referred to above, the users of such drums may require threaded holes in the top wall of the drum. Thus, the incorporation of threaded holes in a drum must also be addressed if a blow molded drum is to be commercially acceptable.

The present invention is directed to a new and unique blow molding machine which is capable of efficiently blow molding large thermoplastic articles such as cylindrical drums and which is endowed with the capability of molding threaded holes into the top wall of such drums when such threaded holes are required.

Briefly, the present invention comprises a multi-station blow molding machine which, in its preferred embodiment as disclosed herein, has a rotary table on which mold cavities are disposed for advancing rotation about a central vertical axis. There are four such stations 90° apart, and there are four mold cavities on the rotary table also 90° apart. The first station is the one at which the blow molding of an article commences, and it is at this same station that completed articles are removed after they have passed through the intervening stations.

At the first station an article is blow molded substantially to its final shape against the walls of the cavity and after this step has been completed the mold is advanced to the second station.

Associated with each cavity is a blow pin assembly and it is via the blow pin assembly that the blow medium is introduced into the cavity to blow the article.

The blow pin assembly is cooperatively associated with the cavity and moves along with the cavity from station to station.

Associated with the first station is a mechanism for operating each cavity between open and closed positions. The illustrated form of mold cavity and mechanism comprises the cavity being in two halves which are pivotally mounted on a vertical shaft on the table spaced radially of the central vertical axis of the table. The two cavity halves open radially outwardly of the central vertical axis in a clamshell-like fashion and are operated by toggles. Drive means for operating the toggles are selectively engagable with the toggles at the first station to open and close the cavity. After the cavity has been closed the drive means are disengaged from the toggles to permit the table to be rotated 90° to advance the cavities. As a cavity travels through the stations from the first station through the second, third and fourth stations and back to the first station, the toggles are effective to hold the halves of the cavity closed.

At the first station a blow assembly is mounted on a movable carrier which takes the form of a wheeled cart. The cart is operable to transport the blow assembly radially inwardly and outwardly relative to the central vertical axis of the table such that when the cart is underlying a mold cavity the blow assembly may be operatively connected with and disconnected from the cavity. When a new article is to be molded, the blow assembly supports the blow pin assembly and the two are elevated in unison on the cart to a position where the blow pin assembly may be cooperatively associated with the cavity. Cooperative association takes place when the two halves of the cavity are closed onto the blow pin assembly. Thereafter, the blow assembly is operated to introduce into the cavity, via the blow pin assembly, blowing medium for blowing an article to substantially its final shape in the cavity. The raw material for the article is provided by an associated extruder and feeder which introduces a parison into the cavity prior to the blow. After the blow has been completed, the blow assembly is lowered onto the cart to disconnect from the blow pin assembly. When the blow assembly clears the blow pin assembly, the table can rotate to advance the cavities.

Upon arrival of a cavity at the second station, an auxiliary blow assembly is cooperatively associated with the blow pin assembly of the cavity to exhaust the blow medium which was introduced into the cavity to blow the article at the first station and to introduce new medium into the cavity. This promotes the proper curing of the thermoplastic material and may involve the introduction of different types of media to promote different curing characteristics. At the same time as the auxiliary blow assembly is operating on the cavity at the second station, a new article is being blown in a cavity at the first station.

After the second station, a cavity is advanced to a third station which also contains an auxiliary blow assembly which operates on the molded article contained therein in similar manner to that of the second station. This promotes a further cooling effect on the molded plastic article leading toward its final dimensionally stable form.

The fourth station also contains an auxiliary blow assembly which operates on the article contained in a cavity at the fourth station in similar manner to that of the third and second stations. It will be appreciated that while a given operation is being conducted at any given station, the other stations are concurrently performing their respective functions.

After the fourth station, the cavity returns back to the first station where it is opened and the completed article removed.

A completed article arriving at the first station must be removed from its cavity before a new article can be molded in that cavity. Removal of a completed article is accomplished by the cart and the blow mechanism. The blow mechanism is once again elevated on the cart to engage the blow pin assembly on the cavity containing the completed article. The cavity halves are opened to allow the completed article to clear the cavity and the cart is moved radially outwardly to transport the article on the cart via the blow pin assembly and the blow assembly.

Where the article is a cylindrical walled drum having holes in its top wall, the article is molded upside down so that the top wall of the article is at the bottom of the cavity. It is at the location of the holes that the blow pin assembly is engaged with the article. Where the top wall of the article has threaded holes, the threaded holes are formed by the molding of the article around complementary threaded portions of the blow pin assembly.

The blow pin assembly and the blow assembly are provided with means for rotating these threaded portions about their axes so as to unthread the threaded portions of the blow pin assembly from the completed article. Thus, the threaded portions are rotated at the time of removal of the article from the machine so that the completed article contains the desired threaded holes. After the completed article has been removed from the blow pin assembly, the blow pin assembly is carried by the cart radially inwardly for cooperatively re-association with the mold cavity preparatory to the blow molding of a new article in the cavity. The procedure thereafter repeats itself in the same manner as described above.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 8 is an enlarged vertical sectional view taken in the direction of arrows 8—8 in FIG. 7.

FIG. 9 is an enlarged fragmentary elevational view partly in cross section of one of the parts of FIG. 1.

DESCRIPTION OF THE PREFERRED EMBODIMENT

Figure 1:
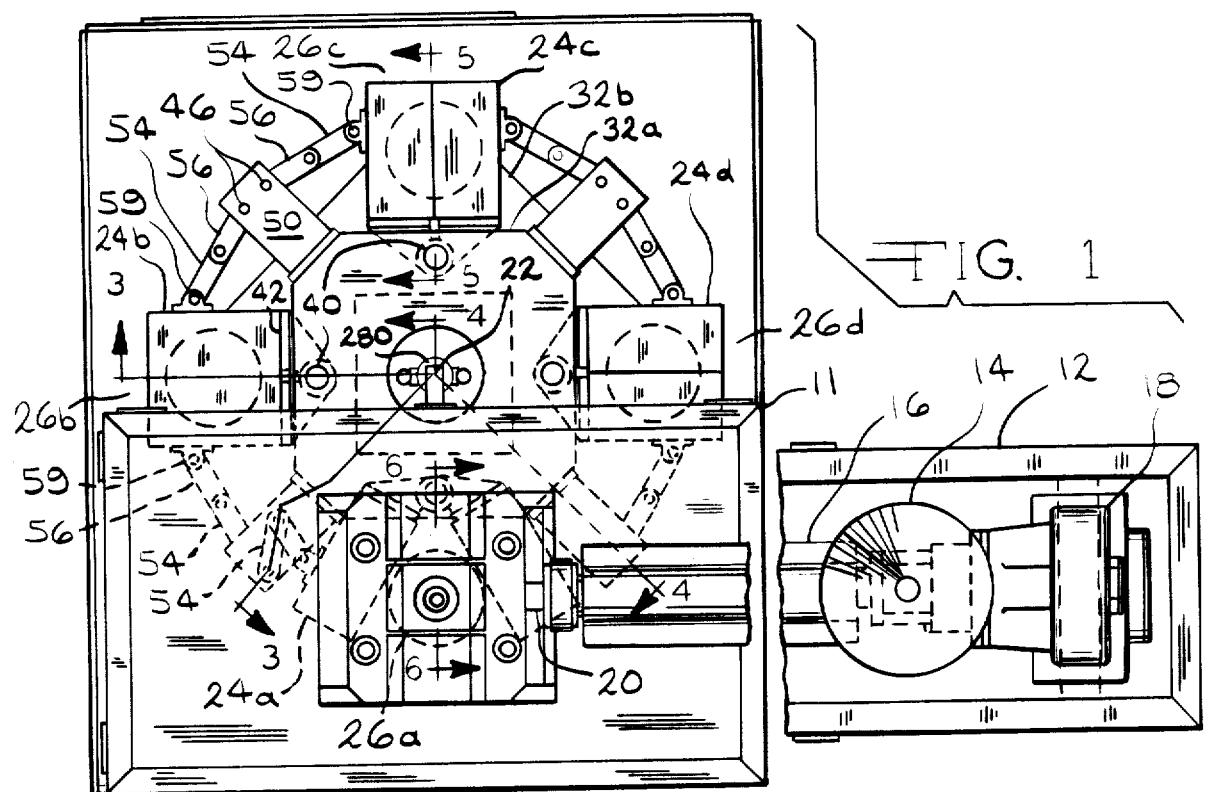
FIG. 1 is a top plan view, a portion being removed, of a blow molding machine embodying principles of the present invention.
Figure 2:
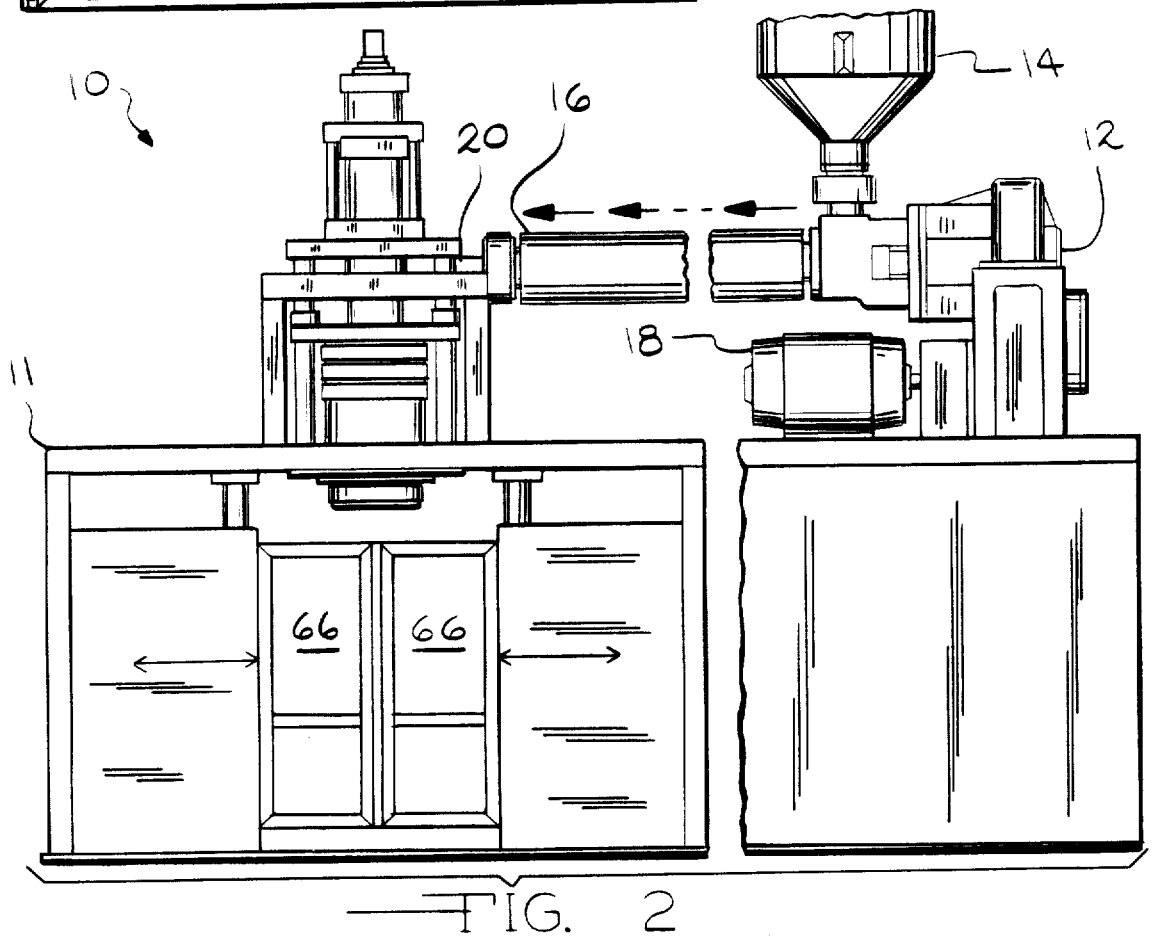
FIG. 2 is a front elevational view of FIG. 1.

FIGS. 1 and 2 illustrate the general overall organization and arrangement of a blow molding machine 10 embodying principles of the present invention. Machine 10 comprises a main housing and frame structure 11 on the left and an associated extruder mechanism 12 on the right.

The extruder mechanism comprises a hopper 14 into which raw material is introduced and a screw extruder 16 which receives the raw material from hopper 14 and conveys the material, extruding it in the process, from right to left as viewed in FIG. 2 and indicated by the small arrows. The drive for screw extruder 16 is generally designated at 18 and comprises the usual components.

The extruded material is delivered at the left hand end of screw extruder 16 to an accumulator head 20 which is operable during operation of the blow molding machine to introduce extruded material into a mold cavity for subsequent blowing of a plastic article in the cavity.

Details of the extruder and accumulator head are conventional and will not be described in any further detail since their respective constructions are known in the art.

The housing and frame structure 11 contains the blow molding apparatus of the present invention. The illustrated construction of the preferred embodiment is a four station rotary machine containing four stations which are arranged 90° apart about a central vertical axis 22. Operations are performed at these four stations, as will be explained in detail herein, and mold cavities are successively advanced through the stations. Thus, the preferred embodiment comprises four mold cavities 24a, 24b, 24c, 24d respectively arranged at 90° intervals about axis 22. The four stations are identifred by the reference numerals 26a, 26b, 26c, and 26d, and FIG. 1 illustrates each station containing a cavity having the same literal suffix.

Figure 3:
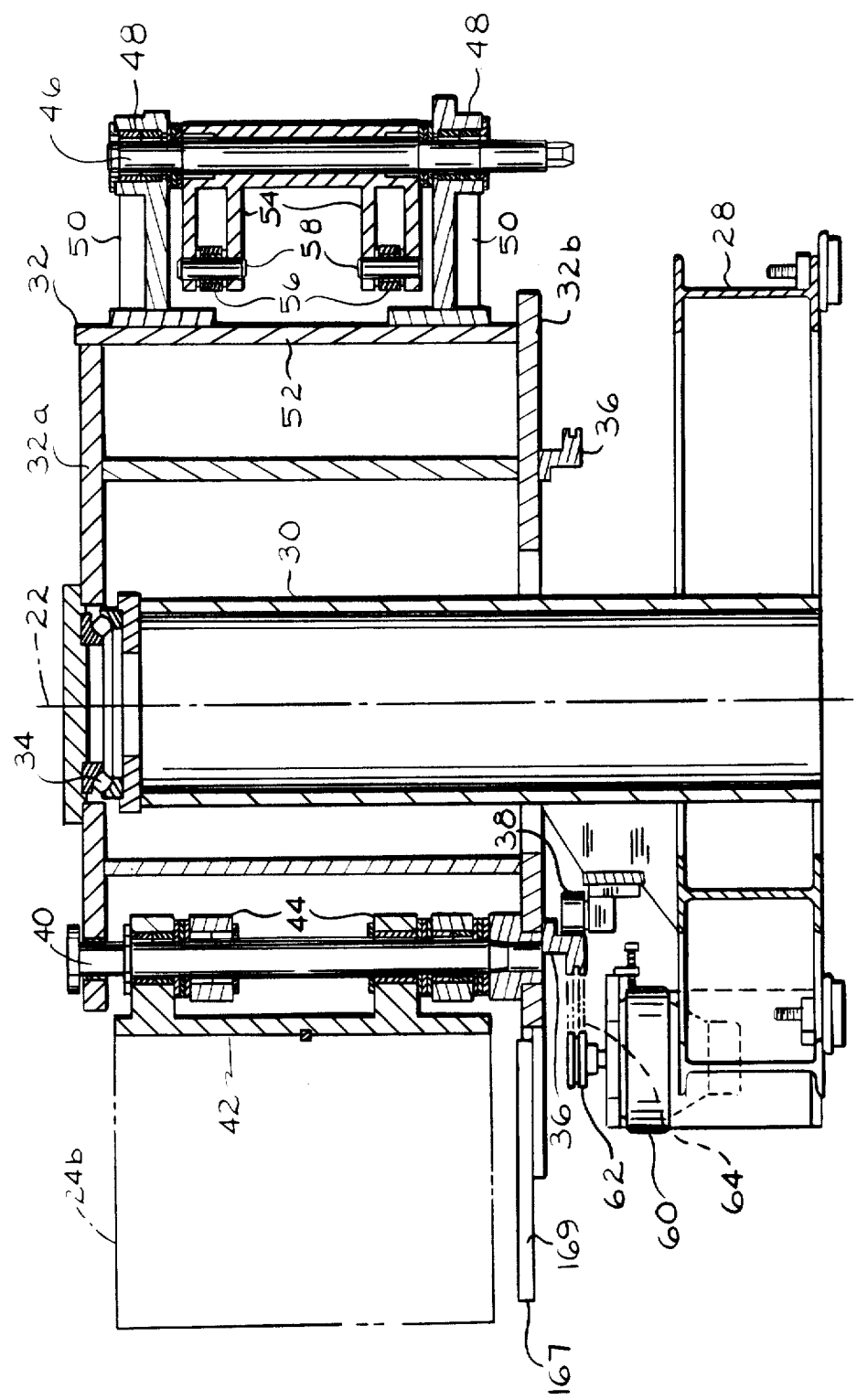
FIG. 3 is an enlarged vertical sectional view as taken along the section line 3—3 in FIG. 1.

Considering FIGS. 1 and 3 it may be explained that the illustrated construction for the mold cavities comprises separate halves which open and close in a clamshell fashion as can be seen from consideration of FIG. 1 which illustrates cavities 24b, 24c and 24d closed and cavity 24a open.

The machine comprises a base 28 (FIG. 3) supporting a central circular upright 30. Upright 30 is concentric with axis 22, and itself serves to support a rotary table 32 containing the four cavities for rotation about axis 22. The table comprises top and bottom members 32a and 32b and a central aperture for upright 30. Top member 32a of the table is supported by bearings 34 on the top of upright 30. Bottom member 32b is guided on the upright by means of a circular ring 36 attached to the underside of the table and whose inner periphery is engaged by means of circular rollers 38 located at intervals around upright 30.

Each mold cavity is supported on a corresponding vertical pivot shaft 40 which extends between the top and bottom members 32a, 32b of the table. Each cavity half mounts on a corresponding mounting bracket which is journaled on the corresponding shaft 40. In FIG. 3 one mounting bracket for one half of cavity 24b is identified by the reference numeral 42 while the other mounting bracket for the other half of cavity 24b is identified by the reference numeral 44. Each bracket 42, 44 has a pair of spaced apart knuckles via which the bracket is journaled on the corresponding shaft 40. The cavity halves removably mount against the radially outer vertical faces of the brackets 42, 44.

Toggle mechanisms are also operatively associated with each mold cavity for operating the cavity halves between open and closed positions.

A toggle operating shaft 46 is vertically supported on table 32 in outwardly spaced relation to the top and bottom members 32a, 32b, and for the illustrated preferred embodiment there are eight such shafts 46. The shafts are supported on the table in suitable journals 48 of vertically spaced apart mounting brackets 50. Brackets 50 project radially outwardly from vertical members 52 of the table assembly, the members 52 being joined to the members 32a, 32b. Brackets 50 are arranged in pairs with said pairs being arranged at 90° intervals around the table and being offset 45° relative to the cavities whereby each pair of brackets 50 is located half-way between immediately adjacent cavities. Each pair of brackets 50 serves to support and journal two shafts 46 in side-by-side manner. The shaft 46 which appears at the right hand side of FIG. 3 is operatively associated with the left hand half of cavity 24a as viewed in FIG. 1.

The operative connection of shaft 46 with the corresponding half of cavity 24a is provided by a pair of toggle links 54 and 56 respectively. Each toggle link 54, 56 comprises a pair of vertically spaced apart link arms and each link arm of toggle link 54 is coupled with a corresponding link arm of toggle link 56 by means of a pinned connection 58. Link 54 is keyed to shaft 46 for rotation therewith. The end of link 56 opposite pins 58 pivotally connects with the corresponding mold cavity half at 59. With this arrangement, rotation of shaft 46 is effective to operate the toggle links and hence swing the corresponding mold cavity half. FIGS. 1 and 3 illustrate cavity 24a in the open position, and it can be seen that the corresponding toggle has assumed a non-extended condition. Upon rotation of shaft 46 of FIG. 3 in the clockwise direction as viewed in FIG. 1, the toggle is extended to cause the mold cavity half to close.

The illustrated construction of the cavities comprises a common vertical parting plane which is disposed radially of axis 22 when the two halves are closed against each other. As will be seen in the ensuing description it is only at station 26a at which the mold cavities are opened. As the cavities advance through the successive stations 26b, 26c, 26d and back to station 26a they remain in the closed position, and for this purpose the toggle mechanisms may be provided with a small amount of over-center travel so as to lock the cavities in closed condition.

The drive for rotating table 32 can also be seen in FIG. 3. It comprises a hydraulic motor 60 mounted on base 28 adjacent a location on the outer periphery of the base. The motor has a rotary output 62 which rotates about a vertical axis. Output 62 is coupled with the outer perimeter of ring 36 by means of an endless drive element 64. By way of example, the preferred embodiment comprises the endless drive element being an endless chain with there being matching sprockets on output 62 and the outer perimeter of ring 36. The hydraulic fluid power to motor 60 is supplied from a conventional source (not shown) and the motor is operated in timed relationship by the associated control to rotate the table in 90° increments from station to station. This may be accomplished by means of conventional limits switches and control circuitry. It should also be pointed out that in plan (i.e. FIG. 1) the hydraulic motor 60 is physically located directly below the brackets 50 which lie between stations 26b and 26c.

Station 26a is the beginning station as well as the end station. Access to station 26a is from the front as can be best seen from consideration of FIGS. 1 and 2. The front of the housing and frame structure 11 is provided with a set of double doors 66 which are movable laterally toward and away from each other to open and close an access opening to station 26a. The mechanisms for operating these doors are conventional and are not illustrated in the drawing figures. Preferably, the doors open only when a completed article is ready to be removed from the machine by an operator. After a completed article has been removed the operator operates a suitable control to close the doors and initiate blowing of a new article. Certain operating mechanisms of the blow molding machine are associated exclusively with station 26a. These are illustrated in FIGS. 4 and 6 through 8 which will be next described.

Figure 4:
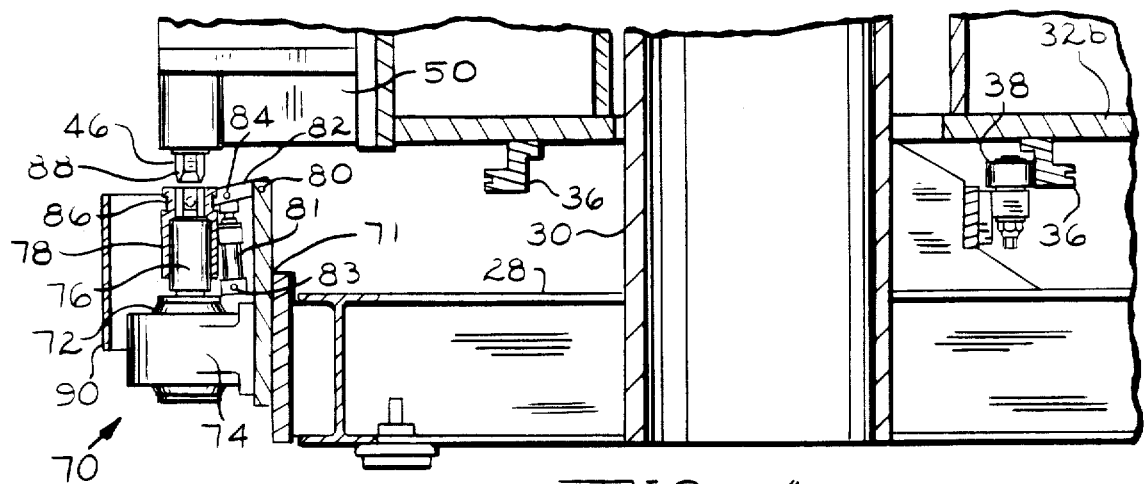
FIG. 4 is an enlarged fragmentary vertical sectional view taken in the direction of arrows 4—4 in FIG. 1.

FIG. 4 illustrates a portion of the operating mechanism for opening and closing a cavity at station 26a. FIG. 4 illustrates that portion which is located at the right hand side of station 26a as viewed in FIG. 1 and it will be appreciated that there is a corresponding portion located at the left hand side of the station essentially identical to that at the right hand side.

After the rotary table has positioned the mold cavities at the respective stations, the toggle operating shafts 46 at either side of the mold cavity at station 26a are in vertical alignment with corresponding toggle shaft operating mechanisms 70 disposed directly beneath. Each toggle operating mechanism mounts on the outer periphery of base 28 by means of suitable mounting structure 71. The mechanism comprises a rotary drive 72 which may take the form of a small fluid motor. The motor comprises a frame 74 via which it mounts on structure 71 and a rotary output shaft 76 which is vertically disposed in alignment with the overlying toggle operating shaft.

A tubular sleeve coupling 78 fits onto shaft 76 and is rotatably coupled with the shaft by means of a suitable coupling arrangement such as a key, but it is also axially movable of the shaft. FIG. 4 illustrates coupling 78 in its retracted position in which it is disengaged from operative coupling with the overlying toggle operating shaft. The coupling is operated into coupling engagement with the overlying toggle operating shaft by means of a cylinder and lever mechanism mounted at one side.

This cylinder and lever mechanism comprises a lever 82 pivoted on mounting structure 71 by means of a pivot 80. The far end of lever 82 is operatively coupled with coupling 78. The mechanism also comprises a fluid cylinder 81 whose head end pivotally mounts on mounting structure 71 at 83 and whose rod is pivotally connected with lever 82 at 84. The upper end of coupling 78 is provided with a circular groove 86 extending circumferentially around the sidewall of the coupling. The distal end of lever 82 opposite pivot 80 is shaped to engage this groove.

FIG. 4 illustrates the cylinder in its retracted position. In this position coupling 78 is disengaged from the overlying toggle operating shaft. When the cylinder is operated to extension lever 82 pivots about 80 swinging in a clockwise arc as viewed in FIG. 4 to lift coupling 78 upwardly by virtue of its engagement with groove 86. The cylinder is extended such that the upper end of coupling 78 is engaged with a mating coupling 88 at the lower end of shaft 46 while coupling 78 remains rotatably coupled with output shaft 76. The engagement of couplings 78 and 88 is a keyed one such that rotation of shaft 76 by motor 72 is effective to rotate shaft 46. The rotation of motor 76 is controlled by means of suitable controls to operate the corresponding mold cavity half between the open and closed positions. After completion of the toggle operation, cylinder 81 is operated to its retracted condition so as to disengage the two couplings 78 and 88 from each other. In the retracted position it can be seen that the mechanism 70 is clear of the table so as to permit free rotation of the table.

Appropriate limit switches and conventional controls (not shown) are used to control the operation of the machine and to insure that the proper sequence of operations has occurred before rotation of the table is permitted. It will be appreciated that although the two mechanisms 70 are separated from each other on the machine, they may be controlled in unison so that the mold cavity halves operate between open and closed position in similar unison. It is also good practice to provide a shield 90 around the outside of the moving parts of the mechanism 70.

Figure 6:
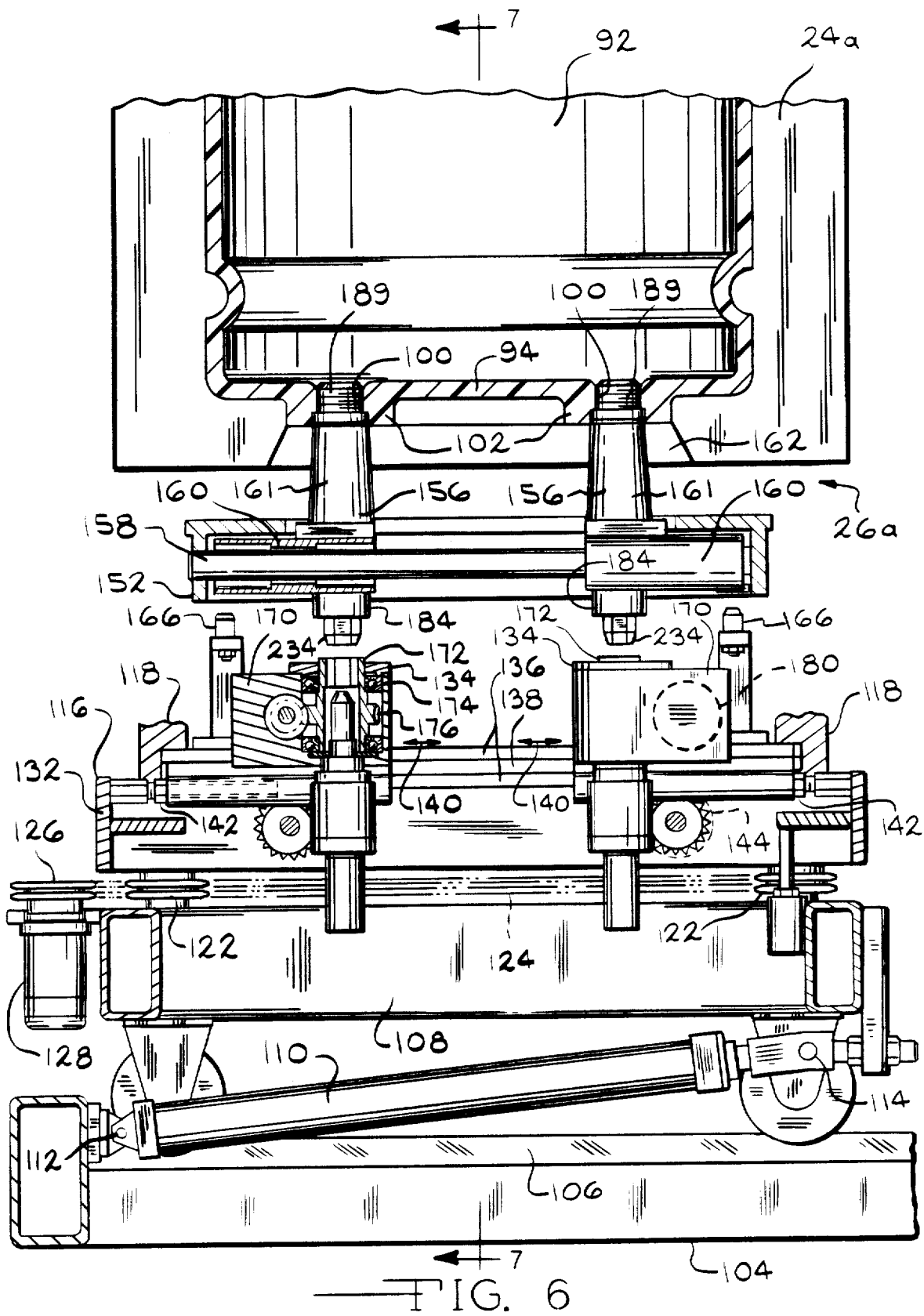
FIG. 6 is an enlarged fragmentary vertical sectional view taken in the direction of arrows 6—6 in FIG. 1.
Figure 7:
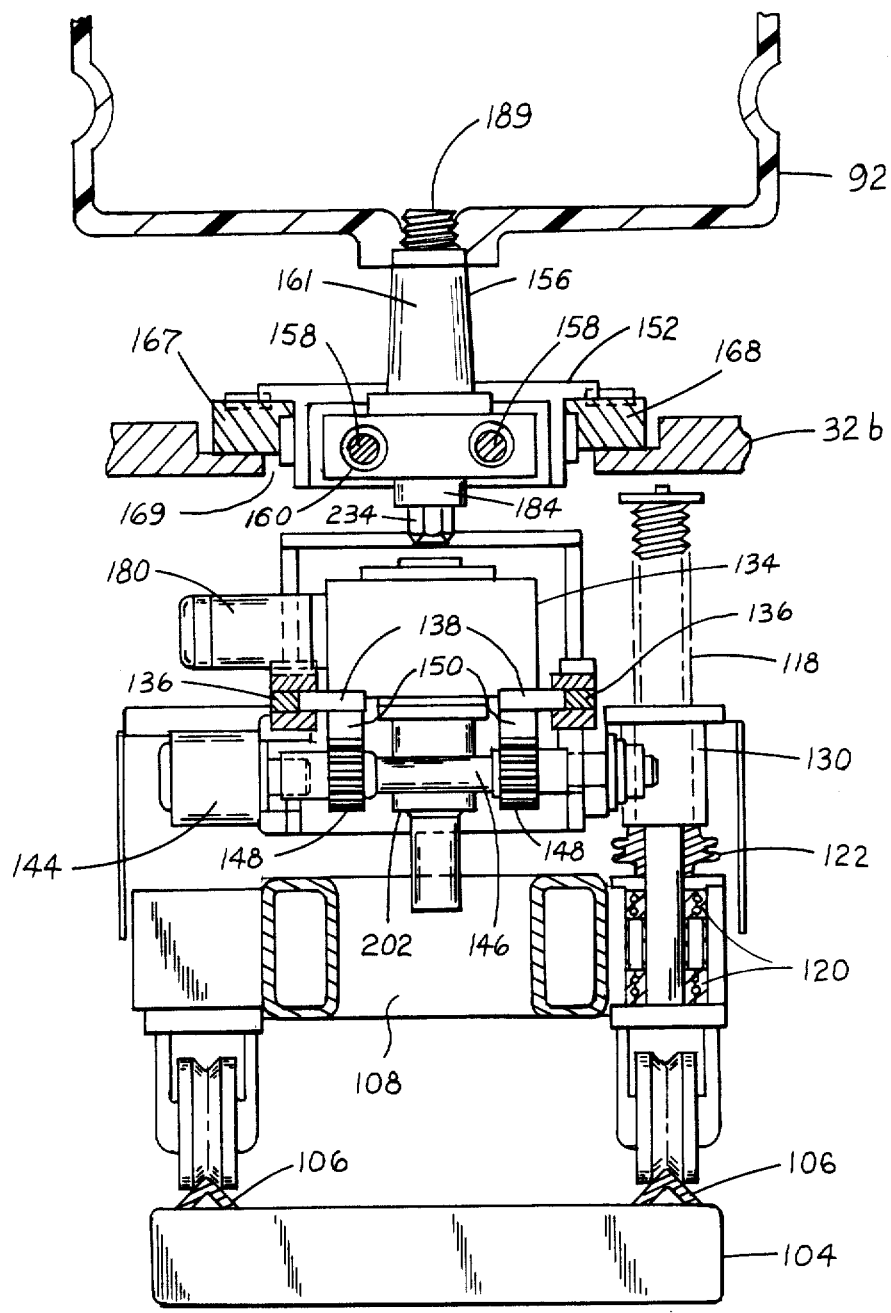
FIG. 7 is a vertical sectional view taken in the direction of arrows 7—7 in FIG. 6.

A further portion of the operating mechanism which is located at station 26a is illustrated in FIGS. 6 through 8. In FIG. 6 the half of cavity 24a which is on the right as viewed in FIG. 1 is illustrated in the closed condition. The illustrated cavities are constructed for the blow molding of large thermoplastic articles such as cylindrical walled drums. FIG. 6 illustrates a portion of such a drum 92 within the mold cavity 24a. The drawing figure illustrates the lower portion of the mold cavity and the corresponding portion of drum 92.

The illustrated drum is a cylindrical circular walled container which has circular end walls joined by a corresponding circular side wall. It may include one or more circular beads extending around the sidewall. The illustrated blow molding apparatus molds the drums upside down. In other words, the end wall 94 which appears in FIG. 6 as the bottom wall is in fact the top wall of the drum.

The illustrated construction of the apparatus is also for providing circular screw threaded holes 100 in the top wall of the finished drum and these are shown in FIG. 6 as being formed in embossments 102 in wall 94.

The additional apparatus at station 26a comprises a horizontal track structure 104 having a pair of laterally spaced apart parallel rails 106 on which a wheeled cart, or dolly, 108 can roll. The track structure is arranged such that the rails are disposed generally radially of central axis 22 so that the cart similarly travels radially. The prime mover for the cart comprises a fluid cylinder 110 having its head end pivotally mounted with the base structure of the machine at 112 and having its rod pivotally coupled with the cart at 114.

FIG. 6 illustrates the cylinder in the retracted position with the cart disposed directly beneath the mold cavity 24a at station 26a. When the cylinder is operated to extend its rod the cart is rolled to the right as viewed in FIG. 6 along the track structure to move it radially outwardly away from its position directly below the cavity. Similarly when the extended cylinder is retracted, the cart is rolled radially inwardly.

Cart 108 supports a blow assembly generally designated by the reference numeral 116. The blow assembly is mounted on the cart for vertical displacement with respect to the cart. This is accomplished by means of four upright screws 118 disposed at the four corners of the cart, the cart being generally rectangular shaped in plan. It can be seen in FIG. 7, which illustrates only a single one of the screws 118 for purposes of clarity, that the lower end of each screw is suitably journaled on the cart in journal bearings 120. The screw is rotated by means of a sprocket 122 just above the upper journal 120. An endless chain drive 124 extends around the perimeter of the cart to engage all four such sprockets 122, and chain 124 also passes around a drive sprocket 126 which can be seen in FIG. 6. The drive sprocket 126 is on the rotary output shaft of a motor 128 mounted along one side of the cart. As motor 128 is operated to rotate drive sprocket 126 in one direction, the four sprockets 122 are similarly rotated in unison by drive chain 124.

Nuts 130 are provided at the four corners of blow assembly 116, and each of the four nuts 130 is threadedly engaged with a corresponding screw 118. Hence, as the screws rotate in one direction, the blow assembly is vertically elevated. When the rotation of motor 128 is reversed, the screws rotate in the opposite direction to cause the blow assembly to be lowered. Suitable controls of the blow molding machine are employed to operate the motor in the proper manner at the proper times in the machine's operating cycle. It may also be desirable to provide a tension adjustment mechanism (not shown in the drawing) to tension the drive chain.

The nuts 130 are part of the blow assembly frame 132. The blow assembly comprises a pair of individual blow mechanisms 134 which also mount on frame 132. The blow mechanisms are adjustably positionable on the blow assembly frame by means of guide and guideway structure and suitable adjustment mechanism. More specifically, the two blow mechanisms 134 are spaced apart from each other in the radial direction relative to central axis 22.

For purposes of explanation the length of cart 108 is considered to run in the radial direction relative to central axis 22 while the laterial direction is the horizontal direction at 90° to the length of the cart. Hence, as can be seen from consideration of FIGS. 6 and 7 guide and guideway structure is provided extending lengthwise of the cart on laterally spaced apart sides relative to the center line of the cart. The guideway structure 136 is affixed to frame 132 and is engaged by corresponding guide structure 138 on each individual blow mechanism.

Each individual blow mechanism 134 is guided by the guideway structure for independent adjustable positioning on the frame of the blow assembly as indicated by the double headed arrows 140 in FIG. 6.

Adjustable stops 142 are provided at opposite lengthwise ends of frame 132 to limit the lengthwise adjustment of the respective blow mechanisms 134 in the direction away from each other. Adjustment of each blow mechanism along the guideway structure is motorized by means of a corresponding motor 144. The motor 144 for the radially inner blow mechanism (relative to axis 22) can be seen in FIG. 7. There is a corresponding motor 144 for the radially outer blow mechanism 134, and it is located on the laterally opposite side of the blow assembly and is in phantom in FIG. 6.

The motors are suitably mounted on the blow assembly frame and the output shaft of each motor is coupled with a laterally extending shaft 146 extending laterally across the blow assembly frame and suitably supported. Each shaft 146 contains spaced apart gears 148 on laterally opposite sides of the center line of the cart. Mounted on laterally opposite sides of the underside of each blow mechanism is a corresponding gear rack 150. The gear racks 150 mesh with the respective gears 148 such that when one motor 144 is operated in one direction the corresponding shaft 146 and gears 148 rotate in that same direction to in turn translate the corresponding blow mechanism 134 in a corresponding direction. Reversal of that motor reverses the direction of translation of the corresponding blow mechanism.

Appropriate controls are provided for operating the respective motors, and it can thus be perceived that each of the blow mechanisms 134 is independently positionable along the length of the blow assembly frame.

Also operatively associated with the machine at station 26a is a blow pin assembly 152. The blow pin assembly comprises its own frame 154 and a pair of blow pin mechanisms 156. Each of the blow pin mechanisms is operatively associable with a corresponding one of the blow mechanisms 134.

Each blow pin mechanism 156 is adjustably positionable radially of axis 22 on frame 154, and the adjustment position of the blow pin mechanisms 156 is to secure the desired locations for the holes 100 in the article to be blow molded in the cavity. A pair of laterally spaced parallel circular cylindrical guide rods 158 on frame 154 serve to guide the blow pin mechanisms. Each blow pin mechanism comprises a suitable means 160 for engaging the guide rods 158. Once the desired adjustment position of the blow pin mechanisms 156 has been obtained for a given article to be molded, their positions shall not be further adjusted until such time as a different hole pattern is required in the blow molded articles. It can further be appreciated that once the desired adjustment position of blow pin mechanisms 156 has been obtained, the blow mechanisms 134 are correspondingly adjusted so that each vertically aligns with a corresponding one of the blow pin mechanisms in a manner which will be explained in greater detail hereinafter.

Each blow pin mechanism 156 comprises a tower 161 which coacts with the mold cavity. While the detailed construction of an embodiment of the invention may differ from that specifically disclosed herein depending upon the requirements of any given article and cavity, the illustrated construction comprises blow pin assembly 152 further having a cooperative portion 162 for cooperative association with the mold cavity. This portion 162 has apertures fitting onto towers 161 after the blow pin mechanisms have been suitably adjusted so that portion 162 becomes a part of blow pin assembly 152. Construction details of the illustrated preferred embodiment shown in FIG. 8 will be subsequently explained in greater detail. Briefly, for the moment it can be noted that FIG. 8 illustrates blow pin assembly 152 in cooperative association with mold cavity 24a. The portion 162 cooperatively forms a portion of the lower wall of the cavity which is in juxtaposition to the location of holes 100. Thus, for each cavity it will be appreciated that there is an associated blow pin assembly 152 which travels with the closed cavity around the machine during one full 360° revolution of rotary table 32.

When a cavity is disposed at station 26a, certain operations are conducted. Certain of these operations involve the transport of blow pin assembly 152 on cart 108. Specifically, transport of the blow pin assembly on the cart is through the intermediary of the blow assembly 116. When the blow pin assembly is supported on the cart, the weight of the blow pin assembly is taken by supporting bridges 166 at lengthwise opposite ends of the blow assembly so that the load is taken between the frames 154, 132 and not between the blow mechanisms 134 and blow pin mechanisms 156.

While cart 108 and blow assembly 116 may be capable of adequately supporting the weight of blow pin assembly 152 and a molded article on the blow pin assembly, it is desirable to provide additional support structure on the machine not merely for the weight of a blow pin assembly and molded article but also to provide additional stability and allow the blow pin assembly 152 to be supported by a means other than either the cart or a cavity itself. This is accomplished by providing a pair of parallel rails 167, 168 which project radially outwardly from the bottom portion 32b of table 32 at the location of each cavity.

FIG. 7 illustrates the rails 167, 168 which are associated with cavity 24a while the rail 167 which is associated with cavity 24b appears in FIG. 3. Mounting of the rails on the bottom portion 32b of table 32 is accomplished by providing a cutout 169 in the bottom table portion 32b below the location of each cavity. The illustrated cutout has parallel side edges and grooves are provided adjacent these side edges in the top surface of the bottom table portion and the rails 167, 168 are disposed in and suitably secured on these grooves.

Each set of rails 167, 168 serves to guide blow pin assemblies radially outwardly relative to central axis 22, each blow pin assembly being provided with horizontal and vertical guide plates affixed to the longitudinal sides of its frame to provide for its guidance by means of rails 167, 168.

By providing rails 167, 168, it is possible for a blow pin assembly to be supported on the table without any underlying support by cart 108 in the case of station 26a and without being captured by the closed halves of any of the mold cavities.

When a blow pin assembly 152 and blow assembly 116 have been operatively engaged with each other and the former operatively associated with a cavity at station 26a, that station operates to introduce blow medium into the cavity to blow an article. Blow medium is introduced via blow assembly 116 and blow pin assembly 152. Exactly how this is accomplished is explained with reference to details of the construction of each blow and blow pin mechanism as shown in FIGS. 6 and 8.

Each blow mechanism 134 comprises a main body 170 having a vertical bore. Disposed within this bore is a rotary coupling 172 which is suitably journaled within the bore for rotation about its vertical axis by means of bearings 174. The coupling 172 is provided with a central gear 176 disposed axially between its two points of bearing support within the bore. Gear 176 constitutes a driven gear meshing with a drive gear 178 (see FIG. 6) which is to one side of the bore and located within its own transverse horizontal bore which intercepts the vertical bore containing the coupling 172. The two gears constitute a worm and wheel. Gear 178 is driven by its own motor 180 mounted on the housing sidewall. Operation of motor 180 will be effective to rotate coupling 172 about the vertical axis of the coupling. It is this vertical axis of each coupling which aligns with a corresponding vertical axis of the tower 161 of the overlying blow pin mechanism 156. The upper end of each coupling 172 is open and is configured for a rotationally keyed engagement with a complementary keyed coupling 184 projecting downwardly from the overlying blow pin mechanism 156 when blow assembly 116 has been elevated to engage with blow pin assembly 152. FIG. 6 illustrates the disengaged condition, and it will be appreciated that when blow assembly 116 is vertically elevated to the broken line position of FIG. 8, the two couplings 172 and 184 of each set are rotatably coupled together. With the two couplings 172 and 184 of each set engaged, operation of the corresponding motor 180 imparts rotation to a tubular sleeve 190 extending through the vertical bore of the overlying tower 161 of the corresponding blow pin mechanism.

Each coupling 184 is at the lower end of the corresponding sleeve 190. A threaded element 189 is affixed onto the upper end of each sleeve 190 atop the corresponding tower 161, and each sleeve 190 is suitably journaled such that rotation of its coupling 184 by the corresponding coupling 172 is effective to rotate the corresponding threaded element 189. As will be explained more fully later on, elements 189 are rotated to remove a completed article from the machine.

As nentioned above, blow medium is introduced into a cavity at station 26a via each blow mechanism and the corresponding blow pin mechanism. In each blow pin mechanism blow medium flows through the vertical bore 192 of sleeve 190. A frusto-conically tapered seat 194 is provided adjacent the upper end of bore 192, and a spherical ball 196 seats on seat 194. A pin 198 extends centrally downwardly from ball 196 through almost the full length of bore 192. Certain pin guides may be provided at axial intervals to center pin 198. These guides do not appreciably obstruct flow through bore 192.

The threaded element 189 at the top of each tower 161 is a cap-shaped element having a threaded sidewall. The top wall contains a central aperture 200 through which bore 192 is communicated to the interior of the cavity.

The blow and blow pin mechanisms have further complementary portions which are operatively associated when each blow mechanism is engaged with the corresponding blow pin mechanism. In each blow mechanism the further complementary portion comprises a blow nozzle assembly 202 whose upper end is adapted to make connection with the lower end of the sleeve 190 of the overlying blow pin mechanism and serves to introduce blow medium through the overlying blow pin mechanism into the cavity for blowing of an article in the cavity.

Each blow nozzle assembly 202 comprises its own housing 204 which mounts on the underside of its blow mechanism body 170 and which provides for connection of a blow conduit line 205 to the blow mechanism. It further includes a nozzle portion 206 which projects from housing 204 to extend upwardly centrally through the bore of tubular coupling 172.

The nozzle portion 206 is fabricated from several individual parts. It comprises a circular tubular walled body 208 having a tapered nose piece 210 fitting onto the upper end. The lower portion of body 208 is guided within a corresponding bore in the upper wall of housing 204 by means of a sleeve bushing 212. A helical coil spring 214 is disposed between the lower circular edge of nose piece 210 and a circular flange at the upper end of bushing 212 and serves to position the nozzle assembly within the tubular coupling 172 to the illustrated condition. It can be appreciated that when a downward force is applied to the nozzle assembly, the nozzle assembly is displaced downwardly within both housing 204 and coupling 172, spring 214 resiliently yielding in the process.

Also contained within nozzle assembly 202 is an elongate pin 216. Pin 215 comprises an internally threaded cap 218 at its lower end which threads onto the rod 220 of an air cylinder 222 which itself separably mounts on the bottom wall of housing 204. The cylinder rod passes through a central hole 226 in the bottom wall of housing 204.

Pin 216 extends upwardly through tubular body 208 with the upper end of the pin terminating just below the upper edge of the opening through nose piece 210. Also disposed within the nozzle assembly is a guide 228 which is axially captured between the upper circular edge of tube 208 and an internal shoulder of the nose piece 210 which is fitted over the upper end of tube 208. This guide 228 has a central aperture for guiding and locating the upper end of pin 216, yet it contains suitable apertures allowing fluid to pass through the nozzle assembly.

The tapered upper end of nose piece 210 is shaped to seat coaxially with a complementary shaped seat 232 of a mating fitting 234 which projects downwardly from the overlying blow pin mechanism. Fitting 234 is of tubular shape to form a continuation of the bore 192 of sleeve 190. When nose piece 210 is seated with fitting 234, a closed communication path is established between the blow mechanism and the overlying blow pin mechanism.

FIG. 8 illustrates the relative positions of the various components of the blow mechanism which are assumed when the blow mechanism is disengaged from the overlying blow pin mechanism. As the blow mechanism is vertically elevated to engage with the overlying blow pin mechanism, the tapered nose piece 210 of nozzle assembly 206 first seats with seat 232 of fitting 234. The upward advance is continued with spring 214 increasingly yielding as the nozzle assembly is displaced slightly downwardly within bushing 212. This creates a suitable seal between the nozzle assembly and fitting 234.

As the final upward increment of travel of the blow assembly is completed, the keyed upper end of coupling 172 also comes into keyed engagement with coupling 184. Hence, in the final upward position as indicated in the broken lines of FIG. 8, coupling 172 is also rotatably coupled with element 189.

The construction and arrangement is such that both blow mechanisms operatively engage the overlying blow pin mechanisms in the manner just described essentially simultaneously.

Thus at station 26a blow medium can be introduced into a cavity at that station by two separate blow paths. Additional external apparatus of the machine (not shown) is provided so that blow medium is introduced to blow an article in the cavity at station 26a. This apparatus and the controls therefore are conventional and will not be described in detail. Suffice it to say that when the article is being blown in the cavity at station 26a only blow medium is introduced into the cavity and no rotation is imparted to threaded elements 189. Rotation is imparted to the threaded elements only at the time of removal of a completed article from the machine after it has passed through the four stations of the machine. Details of exactly how this removal is accomplished will be explained in greater detail hereinafter.

The blowing operation comprises pressurized air being introduced via each blow mechanism as follows. Pressurized air is introduced into the interior of housing 204 via line 205. It passes upwardly through tube 208 and the seated nose piece 210 and fitting 234. It continues through bore 192 and unseats ball 196 to pass through the cap aperture 200 into the mold cavity to shape the parison.

Air cylinder 222 and pins 216, 198 are operated when the cavity returns to station 26a after having passed through stations 26b, 26c, 26d, and the manner of operation will be explained later on.

After the blowing operation has been completed, the blow assembly is lowered to disengage the blow mechanisms from the blow pin mechanisms. This breaks the rotational connections between them and it also breaks the paths for the blow medium. As the blow medium connections are broken, balls 196 drop onto seats 194 so that blowing medium is confined within the cavity. This medium retention is useful in the formation of the articles and the medium is retained in the cavity as it cycles from station 26a to the next station 26b.

Each of the other three stations, 26b, 26c, 26d also contains blow apparatus. While the apparatus at each of the three stations is essentially identical, it differs in certain respects from that at station 26a. Each station 26b, 26c, 26d contains what is referred to as an auxiliary blow assembly 250 and such an auxiliary blow assembly is illustrated in detail at FIG. 5.

Figure 5:
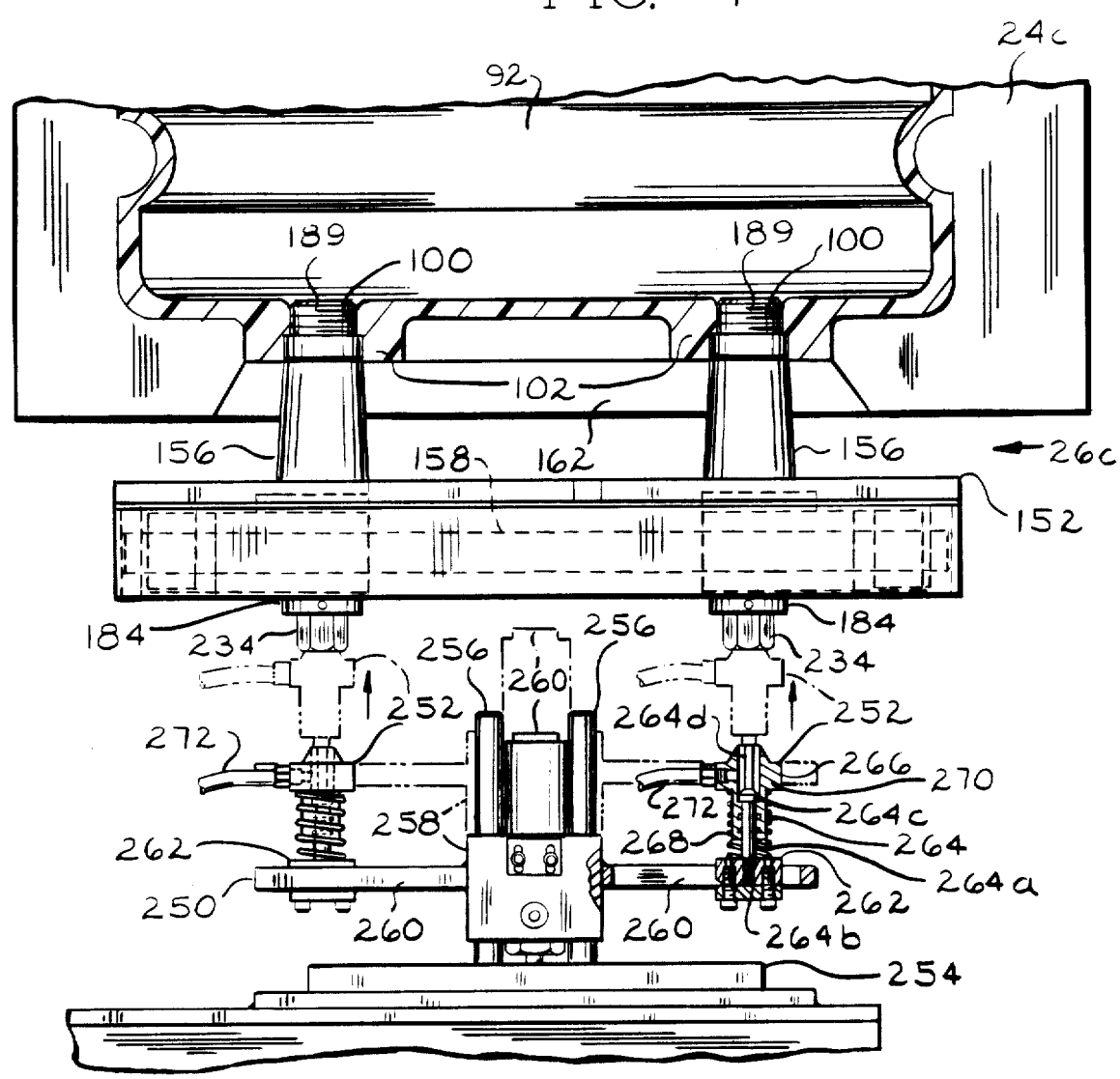
FIG. 5 is an enlarged fragmentary vertical sectional view taken in the direction of arrows 5—5 in FIG. 1.

FIG. 5 illustrates mold cavity 24c at station 26c. A blow pin assembly 152 is operatively associated with cavity 24c. Disposed beneath the blow pin assembly is an auxiliary blow assembly 250. The auxiliary blow assembly comprises two individual auxiliary blow mechanisms 252 which are disposed in vertical alignment with the overlying blow pin mechanism of the overlying blow pin assembly. However, unlike the blow assembly which is carried on cart 108 of station 26a, the auxiliary blow mechanisms comprise no means for imparting rotary motion to the rotary components of the overlying blow pin mechanisms. Rather the auxiliary blow mechanisms are effective only to establish fluid communication to the cavity through the blow pin mechanisms.

The illustrated construction for the auxiliary blow assembly comprises a base 254 having vertical guide posts 256. A slide 258 is guided for vertical motion on posts 256, and vertical motion for the slide is provided by means of a fluid power cylinder 260. The solid line position of FIG. 5 illustrates the lower position of the auxiliary blow assembly in which it is disengaged from the overlying blow pin assembly. The broken line position illustrates the engaged position.

Slide 258 has a pair of horizontal supports 261 extending from opposite sides and each horizontal support serves to mount the corresponding auxiliary blow mechanism 252. Each auxiliary blow mechanism comprises a base 262 via which it mounts on the corresponding support 261. A vertical element extends upwardly from base 262 and is identified by the general reference numeral 264.

Element 264 has respective portions comprising a cylindrical guide portion 264a, a threaded shank 264b at the lower end of portion 264a, a head 264c at the upper end of portion 264a including a frusto-conically tapered seat, and a pin 264d projecting upwardly from head 264c.

The mechanism also comprises a nozzle body 266 having a vertical bore through which element 264 extends. The lower portion of this bore provides a vertical sliding engagement of the nozzle body on the guide portion 264a of element 264. The upper portion of the bore of the nozzle body is diametrically enlarged to accommodate head 264c. Pin 264d is of a reduced diameter.

A helical coil spring 268 is disposed around the outside of the lower portion of nozzle body 266 and extends between a circular flange 270 around the outside of the nozzle body and the top surface of base 262. Spring 268 serves to bias nozzle body 266 upwardly relative to base 262 so as to abut the lower shoulder of head 264 with the shoulder in the bore of the nozzle body. This is the position illustrated in the solid lines in FIG. 5.

As the auxiliary blow assembly is vertically elevated by cylinder 260 to engage with the overlying blow pin assembly, a frusto-conically tapered nose end of each nozzle body 266 seats with the corresponding seat 232 of the overlying fitting 234. Continued upward displacement of the assembly is effective to cause pin 264d to protrude from the upper end of the nozzle body and to engage the lower end of pin 198 of the overlying blow pin mechanism, spring 268 yielding in the process as the nozzle body is downwardly displaced relative toward base 262. Hence in the final uppermost position of the auxiliary blow assembly each ball 196 has been unseated from the corresponding seat 194. Accommodations are also provided for adjustment of the auxiliary blow mechanisms on the support arms.

A fluid conduit line 272 is connected with a radial bore in the flange 270 of each nozzle body 266. When the auxiliary blow assembly is fully engaged with the blow pin assembly, each conduit line 272 is communicated with the interior of the cavity. The preferred embodiment contemplates that one of the conduit lines is used as an inlet while the other is utilized as an exhaust outlet. Hence, the auxiliary blow assemblies are effective to exhaust at least a portion of the existing medium in a cavity upon its arrival at the corresponding station and to introduce new medium into the cavity. In other words each auxiliary blow assembly is effective to circulate medium through the article which has already been blown substantially to its final shape at the first station 26a. This is important in the successful molding of large thermoplastic articles since the medium which is circulated through a cavity at stations 26b, 26c, 26d is effective to remove heat from the article so that it can cure to a dimensionally stable form. Moreover, the arrangement is such that different media may be introduced and circulated through the interior of an article to promote particular curing characteristics. Thus, as the machine goes through its operating cycle, the articles are cured in a controlled manner at the successive stations so that by the time a cavity has completed 360° of travel around the mechanism the article which it contains is in a condition to be removed at station 26a.

Although both auxiliary blow mechanisms 252 of each auxiliary blow assembly 250 have been described as comprising pins 264d for unseating balls 196 when the auxiliary blow assembly is operatively engaged with an overlying blow pin assembly 152, it would be possible for the one auxiliary blow mechanism 252 via which medium is introduced into the molded article to omit the pin 264d and instead rely upon the pressure differential to unseat the corresponding ball 196, assuming a suitable pressure differential.

In order to provide additional cooling to the molded articles via their exterior surfaces which are against the cavity walls, suitable coolant flow passages (not shown) are provided in the respective cavities, and a cooling medium or fluid is circulated through these passages. FIG. 9 illustrates a suitable mechanism 280 for conveying such fluid to and from the cavities.

Mechanism 280 contains a rotary joint 282 which is of a known construction. An inlet line 284 is connected to the inlet of joint 282 and an outlet line 286 is connected to the outlet of the joint. The mechanism 280 is arranged with its axis aligned with axis 22.

The joint is stationarily mounted on the machine housing frame 11 and does not rotate about axis 22. The lower portion of the mechanism is mounted on table 30 so that the lower portion rotates with the table about axis 22 relative to the stationary joint 282.

The lower portion of the mechanism comprises vertically aligned body portions 288 and 290 with the former being disposed on top of the latter and with joint 282 being disposed on top of the upper body portion 288. Suitable attachment pieces connect and support the body of the rotary joint on body portion 288. The sidewall of each body portion 288, 290 contains four ports uniformly spaced at 90° intervals. Each port of body portion 288 is in alignment and associated with a corresponding port of body portion 290. Each pair of ports in the two body portions 288 and 290 is in turn associated with a corresponding mold cavity. Supply conduits 292 are connected to each of the ports of body portion 288 and return conduits 294 to the ports of lower body portion 290. The internal construction comprises the bodies 288, 290 having separate chambers 296, 298 with the inlet conduit line 284 and with the lower chamber being in communication with the outlet conduit 286 by the rotary joint. Cooling liquid is introduced via the inlet conduit line 284, passing through the rotary joint to the chamber 296. From chamber 296 it is distributed through the lines 292 to the respective cavities to absorb heat from the cavities. The heated fluid returns via the conduit lines 294 to chamber 298. From chamber 298 it passes through the rotary joint to the return line 286. Thus, the mechanism 280 is effective to provide coolant to the cavities as the rotary table revolves.

Having therefore described the various components of machine 10 and their individual operation in relation to the overall operation of machine 10 in the blowing of thermoplastic articles, it is appropriate to summarize the overall operation of the machine beginning with the starting operation at station 26a.

Cart 108 is positioned below the overlying cavity, and blow assembly 116 is elevated on the car by operation of motor 128 to engage blow pin assembly 152. The latter is disposed for capture by the closing halves of the mold cavity.

An open and empty cavity at station 26a is closed by operation of the toggle operating mechanisms 70, with a parison being introduced into the cavity. In the example, the article to be blown is a one piece molded drum having integral top, bottom and sidewalls and being of circular cylindrical overall shape including one or more beads extending around the sidewall, either inwardly directed as shown in the drawing figures or outwardly directed (not shown in the drawing figures). The outwardly directed beads may have overall diameters greater than the diameters of the end walls to allow the drum to be rolled on its side by means of these outwardly directed beads.

With the blow pin assembly cooperatively associated with the mold cavity and with the blow assembly operatively engaged with the blow pin assembly, blow medium is introduced into the cavity to blow the parison. The blow medium is conducted via the two blow and blow pin mechanisms of the disclosed construction.

At the completion of the blow, motor 128 is operated to lower the blow assembly and disengage it from the blow pin assembly. As the blow assembly operatively disassociates from the blow pin assembly the spherical balls within the blow pin mechanisms fall onto their seats thereby closing the passages and retaining the blow medium within the blown article. It will be appreciated that depending upon the particular construction of any given mold and blow pin assembly it may be possible to have the mold halves already closed before the blow pin assembly is cooperatively associated therewith. In that situation the machine may contain additional clamping mechanisms which are operable to clamp the blow pin assembly to the cavity.

When the blow assembly has vertically cleared the blow assembly, motor 60 is operated to rotate table 32, 90° in the clockwise direction as viewed in FIG. 1 to advance each cavity to the next station. Thus the cavity arriving from station 26a arrives at station 26b in the closed condition containing the blown article which has been blown substantially to its final shape at station 26a. During the rotation, fluid may be circulated through the mold cavities via mechanism 280 or the circulation of fluid may be controlled in timed relation to the overall machine operating cycle by suitable controls.

At station 26b the auxiliary blow assembly 250 is elevated to engage each auxiliary blow mechanism with the overlying blow pin mechanism. Medium is introduced into the interior of the article within the cavity by one of the operatively engaged pair of blow and blow pin mechanisms and medium is exhausted from the interior of the article via the other pair. At the completion of the auxiliary blow, the auxiliary blow assembly is lowered to operatively disengage it from the blow pin assembly. The balls seat on their seats within the blow pin mechanisms to retain the medium in the cavity. When the auxiliary blow assembly has cleared the blow pin assembly, the table is again advanced 90° by motor 60 to bring each cavity to the next station.

The procedures at stations 26c and 26d are essentially the same as that described at station 26b and it will be appreciated that operations at any given station are conducted concurrently with the operations at the other stations. However, this does not necessarily mean that actual blowing must be the same at each station.

After a closed cavity from station 26d returns to station 26a, the completed article can be removed from the cavity. This is accomplished in the following manner.

Cart 108 is positioned beneath the cavity and blow assembly 116 is elevated on the cart to engage blow pin assembly 152 in the same manner described earlier. Now however, air cylinders 222 are actuated to extend rods 220 and hence urge pins 216 upwardly. The upward motion of pins 216 is effective to similarly urge pins 198 and balls 196 upwardly to unseat the balls. The unseating of balls 196 is effective to vent the pressurized medium in the blown article back to lines 205 through the communication paths established between the engaged assemblies 116, 152. The additional apparatus and controls (not shown) are effective to vent lines 205 at this time. After venting, cylinder rods 220 are retracted allowing the pins 198 and balls 196 to fall by force of gravity thereby reseating the balls.

The cavity halves are now opened by operation of the toggle operating mechanisms 70, and the cart is moved radially outwardly carrying the blow assembly and the completed blown article on the blow assembly. Motors 180 are operated to rotate the threaded elements 189. As the threaded elements rotate, the complementary threaded holes 100 which have been integrally molded into the end wall of the article, interact therewith so as to cause the article to be elevated vertically with respect to the blow assembly to a point where the elements 189 cease to be threadedly engaged with the threaded holes 100. The article can now be manually removed via the open doors 66.

The foregoing has described a new and unique machine and procedure for making large one-piece molded drums. Although the example is of 55 gallon drums, other sizes and shapes of articles may be made with the invention. While a preferred embodiment of the invention has been disclosed, it will be appreciated that principles of the invention are applicable to other embodiments.

What is claimed is:

1. Multi-station blow molding apparatus comprising a blow mold cavity, a blow pin assembly separate from but cooperatively associable with said cavity, means for advancing said cavity from station to station, means for cooperatively associating said blow pin assembly with said cavity at one of said stations, said apparatus further comprising means: at one of said stations cooperably associable with said blow pin assembly to blow an article to substantially its final shape in said cavity by blowing medium introduced into said cavity via said blow pin assembly; to keep blowing medium in said cavity while it is advanced to a successive station; at said successive station to replace, at said successive station, the blowing medium in said cavity and to introduce new medium into said cavity at said successive station to keep the new medium in said cavity while said cavity is advanced to a further successive station; and finally to remove the article from said cavity.

2. Multi-station blow molding apparatus as set forth in claim 1 wherein said blow pin assembly comprises a threaded portion which is disposed in said cavity when said blow pin assembly is cooperatively associated therewith, the article being molded around said threaded portion of said blow pin assembly to yield a complementary threaded hole in the wall of the article open to the exterior of the article.

3. Multi-station blow molding apparatus as set forth in claim 1 in which said blow pin assembly comprises a pair of spaced apart portions which are disposed in said cavity when said blow pin assembly is cooperatively associated therewith, the article being molded around said spaced apart portions to yield corresponding holes in the wall of the article open to the exterior of the article, and a separate blow pin mechanism for each of said pair of spaced apart portions.

4. Multi-station blow molding apparatus as set forth in claim 3 in which said blow pin mechanisms are mounted on a common frame.

5. Multi-station blow molding apparatus as set forth in claim 4 in which said blow pin mechanisms are adjustably positionable relative to each other on said frame.

6. Multi-station blow molding apparatus as set forth in claim 3 further including a blow assembly at a station, means for operating said blow assembly to selectively connect it with and disconnect it from said blow pin mechanisms, said blow pin mechanisms each comprising valve means via which blowing medium is introduced into said cavity, each said valve means being closed when said blow assembly is disconnected from said blow pin mechanisms but being open when said blow assembly is connected with said blow pin mechanisms.

7. Multi-station blow molding apparatus as set forth in claim 6 further including a carrier on which said blow assembly mounts, means for moving said carrier toward and from said cavity when said cavity is at the station containing said blow assembly, and said means for operating said blow assembly to selectively connect it with and disconnect it from said blow pin mechanisms comprising means for moving said blow assembly relative to said carrier when said carrier is in a position toward said cavity.

8. Multi-station blow molding apparatus as set forth in claim 7 in which said pair of spaced apart portions comprise screw threads and said blow assembly comprises rotary means operable to rotate said screw threads about their respective axes when said blow assembly is connected with said blow pin mechanisms.

9. Multi-station blow molding apparatus as set forth in claim 8 in which said blow pin mechanisms are mounted on a common frame for relative adjustable positioning thereon and wherein said blow assembly comprises a pair of individual blow mechanisms commonly mounted on their own fame for relative adjustable positioning thereon to align respectively with said blow pin mechanisms.

10. Multi-station blow molding apparatus as set forth in claim 1 in which said first-mentioned successive station comprises an auxiliary blow assembly and means for selectively connecting and disconnecting said auxiliary blow assembly with and from said blow pin assembly when the latter is disposed at said first-mentioned successive station, said blow pin assembly and said auxiliary blow assembly comprising means operable when the two are connected with each other to exhaust at least a portion of the blow medium contained within said cavity at the time of its arrival at said first-mentioned successive station and to introduce new medium into said cavity to replace the exhausted medium.

11. Multi-station blow molding apparatus as set forth in claim 10 in which said blow pin assembly comprises a pair of spaced apart portions which are disposed in said cavity when said blow pin assembly is cooperatively associated therewith, the article being molded around said spaced apart portions to yield corresponding holes in the wall of the article open to the exterior of the article, and a separate blow pin mechanism for each of said pair of spaced apart portions, said auxiliary blow assembly comprising a pair of auxiliary blow mechanisms each of which is associated with a corresponding one of said blow pin mechanisms, one of said auxiliary blow mechanisms and the corresponding blow pin mechanism being the exhaust for medium exhausted from said cavity and the other of said auxiliary blow mechanisms and the corresponding blow pin mechanism being the inlet for new medium introduced into said cavity.

12. Multi-station blow molding apparatus as set forth in claim 11 in which said pair of spaced apart portions comprise screw threads and said blow assembly comprises rotary means operable to rotate said screw threads about their respective axes when the blow assembly is connected with said blow pin mechanisms.

13. Multi-station blow molding apparatus comprising a plurality of blow molding cavities, means for advancing said cavities from station to station, a blow pin assembly for each cavity separate from but cooperatively associable with the cavity, means for associating a blow pin assembly with a cavity prior to blowing of an article in the cavity, each blow pin assembly comprising valve means via which blow medium is introduced in the cavity to blow mold an article in the cavity, said apparatus further comprising a blow assembly at one station, means for selectively connecting and disconnecting said blow assembly with and from a blow pin assembly which is associated with a cavity located at said one station, means for blowing an article to substantially its final shape in a cavity located at said one station via the associated blow pin assembly, each said valve means being operable to permit blowing medium to enter the associated cavity when said blow assembly is connected with the associated blow pin assembly and to confine blowing medium in the associated cavity when said blow assembly is disconnected from the associated blow pin assembly, an auxiliary blow assembly at each of one or more successive stations to which a cavity is successively advanced after said one station, means for selectively connecting each such auxiliary blow assembly with and disconnecting it from a blow pin assembly which is associated with a cavity at the corresponding station, and each such auxiliary blow assembly comprising means selectively associable with said valve means of a blow pin assembly located at the corresponding station for exhausting at least a portion of the medium contained within the associated cavity upon its arrival at the corresponding station and for introducing new medium into the associated cavity, each said valve means also confining medium within the associated cavity when the associated blow pin assembly is disconnected from any auxiliary blow assembly, and means to finally remove an article from a cavity at a station after said one or more successive stations.

14. Multi-station blow molding apparatus as set forth in claim 13 in which said means for associating a blow pin assembly with a cavity is disposed at said one station.

15. Multi-station blow molding apparatus as set forth in claim 14 in which said means to finally remove an article from a cavity is also disposed at said one station.

16. Multi-station blow molding apparatus as set forth in claim 15 in which said apparatus includes a carrier at said one station, and means for moving said carrier toward and away from a cavity located at said one station, said blow assembly being mounted on said carrier for transport by said carrier toward and away from a cavity located at said one station, and means for moving said blow assembly relative to said carrier to connect with and disconnect from the blow pin assembly of a cavity located at said one station.

17. Multi-station blow molding apparatus as set forth in claim 16 wherein each blow pin assembly comprises a screw threaded portion which is disposed in the associated cavity when the blow pin assembly is cooperatively associated therewith, the article being molded around the threaded portion of the blow pin assembly to yield a complementary threaded hole in the wall of the article open to the exterior of the article, each blow assembly comprising rotary means operable to rotate the screw threaded portion of a blow pin assembly about its axis when said blow assembly is connected therewith.

18. Multi-station blow molding apparatus as set forth in claim 17 in which each blow pin assembly comprises two such screw threaded portions which are spaced apart so as to yield corresponding threaded holes in the wall of an article open to the exterior of the article, each blow pin assembly comprising a separate blow pin mechanism for each screw threaded portion, said blow assembly comprising a pair of spaced apart blow mechanisms each disposed for engagement with and disengagement from a respective one of the screw threaded portions of a blow pin assembly, said rotary means comprising a corresponding rotary portion in each of said blow mechanisms, each said rotary portion being operable to rotate the corresponding screw threaded portion about its axis when said blow mechanisms are engaged with the blow pin mechanisms of a blow pin assembly.

19. Multi-station blow molding apparatus as set forth in claim 18 in which the blow pin mechanisms of each blow pin assembly are mounted on a common frame thereof, said blow mechanisms are mounted on a frame of said blow assembly, and the blow pin mechanisms and blow mechanisms are relatively positionable on their respective frames to provide different relative positioning of the holes in articles blow molded by the apparatus.

20. Multi-station blow molding apparatus as set forth in claim 19 in which said blow assembly comprises means for introducing blowing medium simultaneously through each of said pair of blow mechanisms and the corresponding blow pin mechanisms engaged thereby to blow an article to substantially its final shape at said one station and wherein each such auxiliary blow assembly comprises means for exhausting, via one of said blow mechanisms and the corresponding blow pin mechanism engaged thereby, at least a portion of the medium in a cavity upon its arrival at such successive station containing an auxiliary blow assembly and for introducing, via the other blow mechanism and the corresponding blow pin mechanism engaged thereby, new medium into the cavity.

21. Multi-station blow molding apparatus as set forth in claim 13 in which said cavities mount on a rotary mechanism which is rotatable about a central vertical axis, said cavities being disposed radially of said vertical axis, each cavity comprising separable cavity portions mounted on said rotary mechanism about its own vertical axis spaced radially outwardly of said central vertical axis so that said cavity portions of each cavity open toward the radially outer direction relative to said central vertical axis, toggle means associated with each cavity for operating its cavity portions to open and closed positions, and means selectively associable with said toggle means of a cavity at said one station for opening and closing that cavity.

22. Multi-station blow molding apparatus as set forth in claim 21 including at said one station a carrier for said blow assembly, means for operating said carrier in a direction radially of said central vertical axis with said carrier being disposed vertically below the level of a cavity located at said one station, said carrier being operable to transport said blow assembly to one position directly beneath an overlying cavity and another position which does not directly underlie that cavity, said blow assembly being connectible with and disconnectible from the blow pin assembly of a cavity located at said one station when said carrier is in said one position, and said carrier being moved to said another another position after a cavity at said one station has been operated to its open position, said carrier and blow assembly serving to transport a completed article on the corresponding blow pin assembly radially of the open cavity.

23. Multi-station blow molding apparatus as set forth in claim 22 in which each blow pin assembly comprises a screw threaded portion which is disposed within a cavity when the blow pin assembly is cooperatively associated therewith, the article being molded around said threaded portion of the blow pin assembly to yield a complementary threaded hole in the wall of the article which is open to the exterior of the article, said blow assembly including rotary means operable to rotate the threaded portion about its axis when said blow assembly is connected with the blow pin assembly and in which said rotary means is operated after the corresponding cavity has been opened so as to unthread the threaded portion of the blow pin assembly from the complementary threaded hole in the molded article and to permit the article to be removed from the blow pin assembly.

24. Multi-station blow molding apparatus as set forth in claim 21 including a coolant system operatively associated with the apparatus for distributing coolant to said cavities, said coolant system comprising a coolant distribution mechanism concentric with said central vertical axis and having a portion mounted on said rotary mechanism at said central vertical axis and distribution lines extending from said portion for connection with said cavities, said mechanism having another portion which does not rotate with said rotary mechanism, said mechanism having supply and return lines connected to said non-rotating portion via which coolant is introduced to and conducted from the rotary joint, coolant being conducted through the rotary joint to the cavities, and back via said distribution lines.

* * * * *

UNITED STATES PATENT AND TRADEMARK OFFICE
CERTIFICATE OF CORRECTION

PATENT NO. : 4,505,664
DATED : March 19, 1985
INVENTOR(S) : Walter J. Craig

It is certified that error appears in the above-identified patent and that said Letters Patent is hereby corrected as shown below:

In the Abstract:

line 13, "in" should read --to--.

Column 17, line 44, "station to" should read --station; to--.

Signed and Sealed this

Thirteenth Day of August 1985

[SEAL]

Attest:

DONALD J. QUIGG

Attesting Officer   Acting Commissioner of Patents and Trademarks